United States Patent [19]

Kiser et al.

[11] Patent Number: 5,022,479
[45] Date of Patent: Jun. 11, 1991

[54] MOTOR VEHICLE ENGINE AIR INTAKE SYSTEM INCLUDING MOISTURE ELIMINATION APPARATUS

[75] Inventors: David M. Kiser; James H. King, both of Fort Wayne, Ind.

[73] Assignee: Navistar International Transportation Corp., Chicago, Ill.

[21] Appl. No.: 468,405

[22] Filed: Feb. 16, 1990

[51] Int. Cl.⁵ .................. B60K 13/02; B60K 13/06
[52] U.S. Cl. .................. 180/68.3; 180/69.25; 98/217
[58] Field of Search ............ 180/68.1, 68.2, 68.3, 180/69.21, 69.24, 69.25; 123/41.6, 41.62, 41.7, 41.04; 98/2.17, 2.15; 55/385.3

[56] References Cited

U.S. PATENT DOCUMENTS

| | | | |
|---|---|---|---|
| 2,036,485 | 4/1936 | Lintern et al. | 98/2.15 |
| 2,881,860 | 4/1959 | Ternes | 180/68.3 X |
| 3,232,368 | 2/1966 | Sullivan | 180/69.2 |
| 3,249,172 | 5/1966 | De Lorean | 180/68.3 |
| 3,259,051 | 7/1966 | Boche et al. | 98/2.17 X |
| 3,934,992 | 1/1976 | Thompson | 180/68.3 X |
| 4,235,298 | 11/1980 | Sackett et al. | 180/68.3 |
| 4,420,057 | 12/1983 | Omote et al. | 180/68.3 |
| 4,516,650 | 5/1985 | Yamaguchi et al. | 180/68.3 |
| 4,831,981 | 5/1989 | Kitano | 180/68.3 X |
| 4,878,555 | 11/1989 | Yasunaga et al. | 180/68.3 |
| 4,932,490 | 6/1990 | Dewey | 180/68.3 |

FOREIGN PATENT DOCUMENTS 1034340 7/1953 France ................ 180/68.2

OTHER PUBLICATIONS

"International 4000 and 7000 Series Trucks and Tractors", Brochure No. AD-42546S, 1988, pp. 16-17.

Primary Examiner—Andres Kashnikow
Assistant Examiner—Brian L. Johnson
Attorney, Agent, or Firm—Dennis K. Sullivan

[57] ABSTRACT

An elongate, shallow, rectangular duct is formed in a vehicle hood by structure depending from an inner surface thereof, the hood inner surface forming a top surface of the duct. The rectangular duct includes a forward ambient air inlet and a rear air outlet and incorporates a series of baffles strategically located between the two for eliminating moisture from air flowing therebetween. A sealing sleeve disposed in the duct outlet to engage the engine air cleaner is provided within the duct with an internal passage having a bellmouth nozzle entrance section to the outlet and an external surface having a third baffle section thereon within the duct. The portion of the sleeve external of the duct includes a bellows section to accommodate variations in the position of the air cleaner inlet.

28 Claims, 2 Drawing Sheets

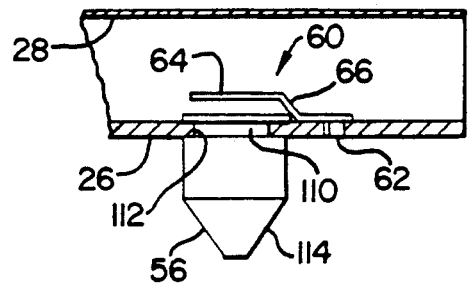
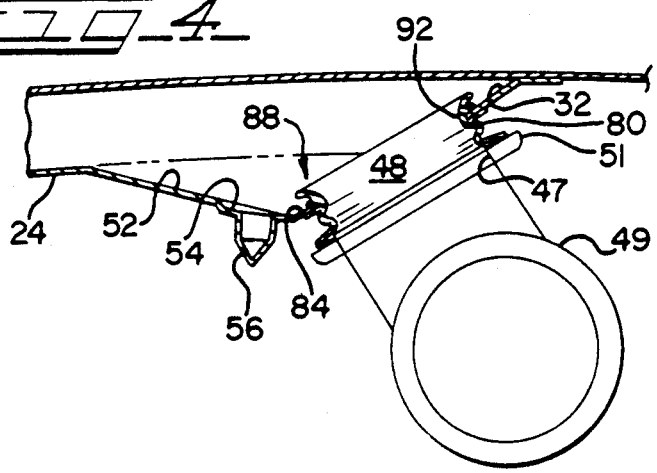
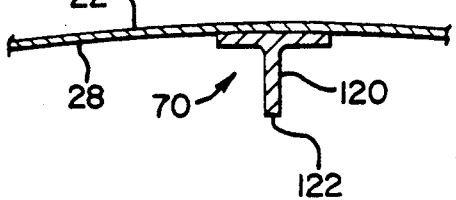
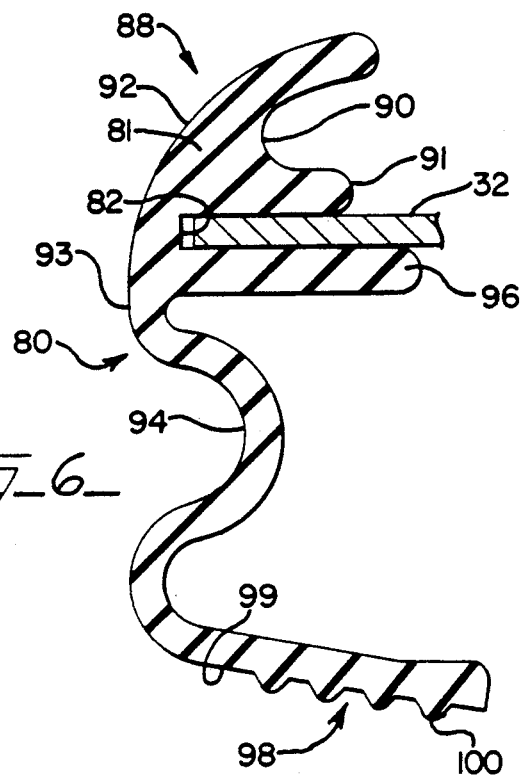

MOTOR VEHICLE ENGINE AIR INTAKE SYSTEM INCLUDING MOISTURE ELIMINATION APPARATUS

BACKGROUND OF THE INVENTION

The present invention relates to an engine air intake system comprising an air duct incorporating moisture elimination apparatus to separate and eliminate moisture from air entering the system. More particularly, the moisture elimination apparatus includes two baffles and drain valves strategically located within a hood-supported structure forming the air duct for channeling air to the engine air cleaner.

THE PRIOR ART

It is previously known to provide ducts within a truck hood to deliver air from the vehicle exterior to the engine. U.S. Pat. No. 3,232,368 to Sullivan teaches a molded fiberglass hood having a rear reinforcement beam bonded to the skin which defines a duct opening through the skin at the rear portion of the hood sides. Within the engine compartment, the duct interfaces with the engine air cleaner to draw induction air into the engine.

However, since Sullivan, the exterior shape of medium and heavy duty trucks is increasingly dictated by aerodynamics. Engine air intake systems comprising an air duct incorporated into the hood are now used to accommodate underhood space restraints created by aerodynamic shapes. These systems additionally may bring cool air from in front of the vehicle into the air cleaner. During rain or snow, air supplied by such air intake system contains moisture which can be laden with harmful elements such as road salt raising the problem of eliminating such moisture. One solution may be found by reference to U.S. Pat. No. 4,971,172 wherein extended ductwork having portions is provided in the hood, the duct having several perpendicular corners to remove moisture from the air. That design is also embodied commercially in 4000 and 7000 Series Trucks sold by Navistar International Transportation Corp. since late 1988.

In more traditional designs, an external scoop or other collection device is used to gather air which is then supplied via a large diameter tube to the air cleaner. These designs often incorporate a skimmer device, possibly located in the tube, which collects and then disposes of the moisture. However, with the advent of aerodynamic, sloped-nose trucks, underhood space is at a premium, and shallow rectangular air ducts must replace the more traditional space consuming tubing to honor the required exterior shape.

SUMMARY OF THE INVENTION

It is the primary object of the invention described and claimed herein to provide an air intake duct system within the hood which includes apparatus strategically located therein for eliminating moisture from air being channeled therethrough to the engine air cleaner.

Another primary object of the invention described and claimed herein is to provide an air intake duct system within a hood which minimizes restriction of the air flow therethrough.

To accomplish these objects, the engine air intake system includes a plurality of skimming devices or baffles and drain valves to eliminate airborne moisture as well as water flowing along the duct surfaces from the system as well as an improved duct to engine air cleaner sealing sleeve providing an internal nozzle within the duct to reduce restriction of the air flow being transferred from the hood to the air cleaner.

The air intake system of the present invention provides several benefits, such as providing a shallow rectangular air intake duct having a high width-to-height ratio, thereby permitting lowering the engine hood relative to the engine therebeneath; providing apparatus therein for removing corrosion-causing moisture, which may also be carrying other undesirable elements, from incoming air and preventing the moisture from reaching the medium of the air cleaner and possibly being ingested into the vehicle engine; and providing an overall net air flow to the engine in which the restriction has not increased, even though barriers to the air flow have been created within the system.

BRIEF DESCRIPTION OF THE DRAWINGS

Other objects and advantages of the invention will become more apparent upon perusal of the detailed description thereof and upon inspection of the drawings in which:

FIG. 3 is a cross-section taken through the front skimmer within the air intake system of FIG. 1;

FIG. 4 is a cross sectional view through the interface between the engine air intake system of the present invention and the engine air cleaner and shows the hood-to-air cleaner sealing sleeve of the present invention;

FIG. 5 is a cross-section taken through the upper hood baffle of the engine air intake system of FIG. 1; and FIG. 6 is a radial cross-section taken through the hood-to-air cleaner sealing sleeve.

DESCRIPTION OF THE PREFERRED EMBODIMENT

Figure 1:
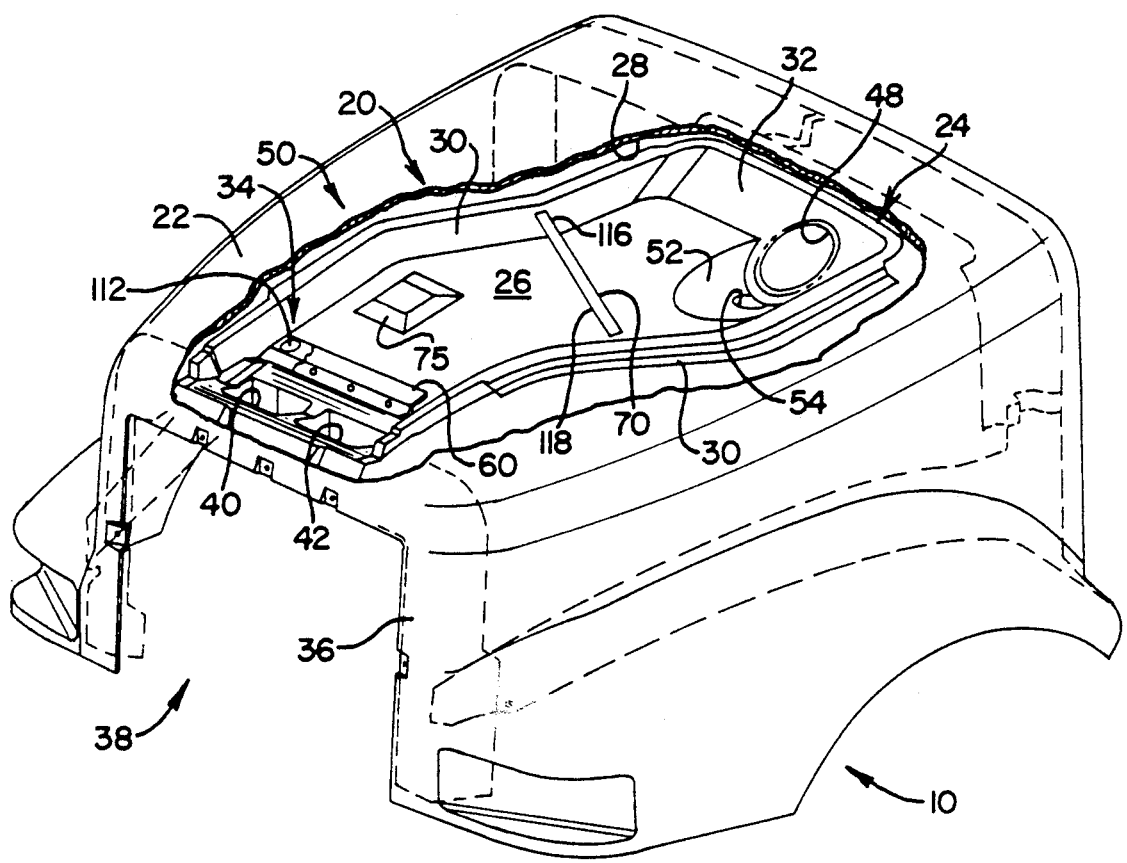
FIG. 1 is a perspective view of a vehicle hood having the engine air intake system of the present invention, the hood skin being partially cut away to better illustrate the various components of the invention.

Referring now to the drawings in greater detail there is illustrated in FIG. 1 a truck hood 10 having a portion of its skin 22 cut away to reveal the various components forming the engine air intake system 20 of the present invention mounted under the hood skin 22 by any suitable means such as by bonding.

The engine air intake system 20 comprises a duct forming structure 24 having a rectangular cross section including a wide bottom wall portion 26 which is supported at a predetermined height below the undersurface 28 of the hood skin 22 by short side walls 30 and a rear wall 32. The undersurface 28 of the hood skin 22 forms the top surface of the engine air intake duct. The bottom wall surface 26 runs essentially parallel to the undersurface 28 of the hood skin and despite the appearance in FIG. 1 (caused by the dogleg of the duct toward the outlet on the driver's side), slopes continuously upwardly from the inlet area 34 to the rear wall 32 as partially shown in FIG. 4.

The forward end 34 of the engine air intake system 20 seats directly behind forward wall 36 of the hood 10, as shown in FIGS. 1. The forward wall 36 defines an opening 38 therein for receiving a grill member (not shown). Two downwardly facing air inlet openings 40 and 42 are formed in the bottom wall portion 26 along the forward end 34 and are situated on either side of the center of the vehicle hood 10. These air inlet openings 40 and 42 allow cool air upstream of the vehicle radiator (not shown) to enter the engine air intake system 20.

As shown in FIG. 4, the duct structure 24 includes at a rear corner thereof an air outlet opening 48 disposed in the rear wall 32 through which air travelling through the intake air duct system 20 may enter the inlet tube 47 to an engine air cleaner housing 49 which is positioned therebeneath. The bottom wall 26 in the rear corner of the duct structure 24 is provided with a well or reservoir 52 positioned directly beneath the air outlet opening 48 having a drain opening 54 therein incorporating one of three drain valves 56.

The moisture elimination system 50 includes two baffle elements 60 and 70 which are provided within the air intake system 20 upstream of the air outlet opening 48 to the air cleaner as well as a hood-to-air cleaner sealing sleeve 80 framing the air outlet opening 48. As shown in FIGS. 1 and 3, the first baffle 60, referred to as a lower hood baffle 60, is provided in the area directly behind the air inlets 40 and 42. This lower hood baffle 60, as best illustrated in FIG. 3 in cross-section includes a leading duct engaging surface 62 and a trailing elevated planar surface 64 which is elevated slightly above the duct engaging surface 62 by means of an angled flange 66 extending upwardly rearwardly. The baffle 60 extends across the entire width of the bottom wall 26 of the intake system 20 and extends only a slight distance thereabove, being stepped upwardly toward its trailing surface 64. The stepped surface 64 acts as an air deflector forcing the air stream crossing thereover to be deflected against the under surface 28 of the hood 10, thereby increasing the effect of the upper baffle 70 to be defined hereinafter. As seen in FIG. 3, the flange 66 of the baffle 60 creates a dam forming a water collection area immediately therebehind, under the elevated trailing surface 64 of the baffle 60. The baffle 60 further creates a zone immediately downstream thereof which is free of air current because the flange 66 of the baffle 60 directs the incoming airflow upwardly away from the bottom wall 26. Further downstream, there will be air currents along the bottom wall 26 but these will still be weaker than those prevailing adjacent the upper side of the duct 24.

Figure 2:
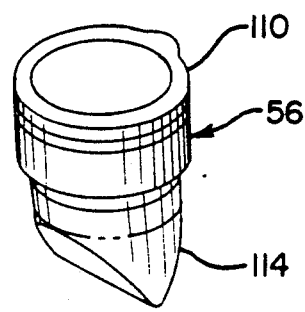
FIG. 2 is a perspective view of a drain valve proposed for use within the system of FIG. 1.

Positioned within the water collection area beneath the upwardly ramped trailing surface 64 of the baffle 60 are two drain valves 56 (one being shown in cutaway in FIG. 4), one toward each longitudinal end of the baffle 60. These drain valves 56 are one-way elastomeric valves commonly found on air cleaners which allow egress of fluid from the system 20 without allowing ingress of hot engine compartment air. Each drain valve 56, as shown in FIGS. 2 and 3, includes a sealing area 110 which snap fits into a strategically located corresponding port or opening 112 within the duct forming structure 24. The drain valve 56 further includes a wedged outlet 114 which allows water droplets to exit therethrough while keeping air from entering the system 20. Once the droplets begin to collect along the flange 66 of the baffle 60, they move therealong toward the drain valves 56 at either end of the baffle 60 and are eliminated from the system 20.

The system 50 next incorporates an upper hood baffle 70 which is shown in cross-section in FIG. 5 and which is attached to and depends from the undersurface 28 of the hood skin 22 and is located downstream of the air inlet openings 40, 42 about two thirds of the length of the duct as shown in FIG. 1 but upstream of the air outlet opening 48 of the duct 24. The upper hood baffle 70 does not have great depth but rather the depending base portion 120 of the baffle 70 extends only slightly into the duct passage similarly to baffle 60 to shear water particles and other accumulations from the upper part of the air stream adjacent the hood skin lower surface 28. The upper hood baffle 70 comprises an elongate structure having a T-shaped configuration in cross section. The length of this baffle 70 is slightly less than the width of the duct structure 24.

From empirical tests, it has been found that an angular placement of this baffle 70 relative to the cross-section of the duct 24 is preferred. In this respect, the right or passenger side end 116 of the baffle 70 is set rearwardly relative to the left or driver side end 118 of the baffle 70 (FIG. 1). The placement is such that the baffle 70 is spaced from the side walls 30 of the duct forming structure 24.

The baffle 70 is situated in the manner described to apply shear forces to the flow of the air stream traveling adjacent the hood to shear water particles from the hood surface thereof. Such water particles collect along the depending portion 120 of the baffle 70 and form droplets along a bottom edge 122 thereof. These droplets tend to fall onto the duct surface 26 and, due to the downward slant of the bottom surface 26 of the duct forming structure 24 from the rear to the front as well as the minimal resistance of low air flow currents along the bottom wall 26, they are able to move upstream along the bottom surface 26 until they engage the flange area 66 formed by the first baffle and exit the system at the drain valves 56 thereat.

An elevation 75 is shown in the bottom wall 26 of the system 20 between the baffles 60 and 70. This elevation 75 has been provided for use with a particular engine to allow clearance therebeneath for the engine. The elevations 75 that are needed in order to adapt the intake system 20 for use with various engines in a vehicle may be of different shape, different height, and different location, depending upon the structure of the engine located therebeneath and upon the clearance required with the hood 10. The high width-to-height ratio of the duct 24 permits the occasional inclusion of such elevations.

Turning attention now to the outlet opening 48 from the engine air intake system 20, particularly with reference to FIG. 4, it will be seen that the air outlet opening 48 therefrom is provided in the rear wall 32 of the system 20. Such air outlet opening 48 is sized and configured to be approximately equal in diameter to the diameter of an air intake opening 47 in an air filter housing 49 and a novel hood-to-air cleaner sealing sleeve 80 is incorporated therein.

As shown best in FIG. 6, the sealing sleeve 80 is a short elastomeric sleeve having a unique wall configuration 81 which includes a circumferential groove 82 having parallel walls and a width about equal to the thickness of the duct structure wall. The sealing sleeve 80 is attachable to peripheral edge 84 of the air outlet opening 48 in duct structure 24, the peripheral edge 84 being received within the circumferential groove 82 and also divides the sealing sleeve 80 into two distinct sections.

The upper or head section 88 of the sealing sleeve 80 has an interior surface 92 portion in the shape of a bellmouth nozzle to enhance the air flow therethrough and minimize restriction. The head section 88 is positioned within the confines of the duct forming structure 24 and the configuration of its exterior wall forms a third skimming device or baffle of the moisture elimination apparatus 50. In this respect, the sealing lip 91 of the groove 82 together with the exterior C-shaped groove 90 defines a baffle which will reroute any water particles which may collect along the back wall 32 of the intake duct structure 24 around the air outlet opening 48 and into the reservoir 52 in the bottom wall 26 of the duct forming structure 24 just below the air outlet opening 48. The one-way drain valve 56 seated within a drain opening in the reservoir 52 at a lowermost point thereof permits any water particles collected within the reservoir 52 to be eliminated.

As alluded to above, the curved inner wall 92 portion of the head section 88 of the sealing sleeve 80, in radial section, converges arcuately inwardly into said passage from the open end of said head section to an interior wall portion substantially parallel to the axis of said passage as at 93 to provide an internal bellmouth configuration that smoothly channels the air stream into the outlet opening, thereby reducing the restriction therethrough. In this respect, in the prior art, air traveling through a hood duct outlet toward an air cleaner disposed therebeneath met a sharp peripheral edge at the air outlet opening restricting air flow therethrough. The reduction in restriction through the opening 48 is so dramatic with the internal bellmouth configuration 92 of head section 88 of the sealing sleeve 80 that it more than compensates for any restriction produced by the first and second baffles 60 and 70 of the moisture elimination apparatus 50.

Turning now to the tail section 94 of the sealing sleeve 80, it will be seen that this section 94 forms an airtight seal between the duct structure 24 and the housing of an air cleaner inlet 47 located therebeneath. The radial cross section of FIG. 6 shows the section 94 to be a bellows with the rear wall 32 of duct structure 24 being held against an upper leg 96 of the section. The lower leg 98 of the tail section 94 is angled radially outwardly and is resiliently movable upwardly upon contact with an upper flange surface 51 of an air cleaner housing 49 to accommodate variations in the location of the flange surface 51, the downwardly directed sealing surface 99 of the lower leg 98 of the sealing sleeve 80 being provided with a plurality of concentric ribs 100 which seat against the flanged surface of the air cleaner housing to form an airtight seal thereagainst.

In summary, air from in front of the vehicle radiator streams into the air intake system 20 through two inlet ports 40 and 42 provided just behind and above the grille of the vehicle. In its travel rearwardly within the air intake system, the air stream first encounters the lower hood baffle 60 extending transversely thereto which directs the air stream upwardly against the hood skin surface 28 while removing entrained moisture from the lower boundary of the air stream. As the air stream travels along the hood skin undersurface 28, it encounters the second baffle 70 which shears or skims water droplets from the hood surface side of the air stream and causes the droplets to collect thereon and then drop to the bottom surface 26 of the air intake system 20.

Once the water droplets reach the bottom surface 26, due to the downward slant of the bottom surface 26 of the duct forming structure 24 from the rear to the front as well as the minimal resistance of low air flow currents along the bottom wall 26, they are able to move upstream along the bottom surface 26 until they engage the dam area 66 formed by the first baffle and exit the system at the drain valves 56 thereat.

The air stream then continues rearwardly toward the angled rear wall 32 of the air intake system 20 which incorporates the air outlet 48 leading into the air filter housing. Surrounding this air outlet 48 is the sealing sleeve 80 incorporating the third baffle 90 which first serves, by its configuration, to reroute any water particles which may collect on the rear wall 32 around the air outlet 48 and into the well or reservoir 52 in the lower surface 26 of the duct 24 and out of the air intake system 20 through a drain valve 56 situated within the reservoir 52. The sealing sleeve 80 secondly serves as a duct-to-air-cleaner seal when the hood 10 is seated in its functional closed position. Finally, the configuration of the head portion 88 of the sealing sleeve 80 provides an internal bellmouth nozzle 92 which creates a smooth transition for the air stream to enter the outlet 48, providing reduced restriction to and through the outlet 48 and into the air cleaner 49.

The reservoir 52 directly ahead of the outlet 48 acts secondarily to create an area of increased cross section immediately upstream of the outlet 48. As the air stream enters this area, its velocity accordingly is diminished and moisture particles suspended therein may drop into the reservoir 52 at the foot of the outlet 48, and exit the system via the drain valve 56 of the reservoir 52.

It will be understood that the provision of the lower baffle 60 and the upper baffle 70, followed by provision of the sealing sleeve 80 surrounding the outlet opening 48 of the air intake system 20, results in an airflow which exits the system 20 that has had a significant proportion of water particles and contaminants held therein removed, providing an air supply to the air cleaner which is substantially dry, causing a significant decrease in the amount of such contaminants which were heretofore entrapped within the material of the air cleaner of the engine.

The engine air intake system 20 including the moisture elimination system 50 of the present invention has a number of advantages, some of which have been described above and others of which are inherent in the invention. In view of the foregoing description, those of ordinary skill in the art will recognize that various modifications, alterations and additions can be made to the invention without departing from the teachings thereof. Accordingly, the scope of the invention is only to be limited as necessitated by the accompanying claims.

We claim:

1. An engine air intake system comprising structure forming an elongate, shallow, rectangular duct which is mounted depending from an inner surface of a vehicle hood and extending horizontally therefrom, said hood surface forming a top surface of said duct, said rectangular duct including a forward ambient air inlet and a rear air outlet adapted to engage an engine air intake, baffle means fixedly attached in said duct between said inlet and said outlet for eliminating moisture from an air stream flowing therebetween, and drain means secured to a bottom surface in said duct between said forward air inlet and said rear air outlet for removing said moisture from said duct.

2. The engine air intake system of claim 1 wherein said baffle means comprise three baffles.

3. The engine air intake system of claim 1 wherein said baffle means comprises a first transversely disposed, laterally elongated, S-shaped baffle mounted to a bottom surface of said duct adjacently downstream of said ambient air inlet.

4. The engine air intake system of claim 3 wherein said first baffle includes a planar leading duct contacting portion, a trailing planar portion offset from said duct and a short rearwardly rising flange joining the leading and trailing portions.

5. The engine air intake system of claim 4 wherein said first baffle extends entirely across the bottom surface of said duct.

6. The engine air intake system of claim 3 wherein said baffle means comprises a second elongate baffle comprising a depending wall attached to the hood surface downstream of said first baffle in intercepting relation to said air stream.

7. The engine air intake system of claim 6 wherein said second baffle is T-shaped with a top surface of said T fixed to the hood surface and a short depending base of the T extending slightly into the duct.

8. The engine air intake system of claim 7 wherein said second baffle is angled relative to the cross section of the duct, one end of said baffle being located rearwardly of another end of said baffle.

9. The engine air intake system of claim 7 wherein said baffle extends less than entirely across the top surface of said duct.

10. The engine air intake system of claim 6 wherein a circumferential duct-to-air cleaner sealing sleeve is seated within an opening of said rear air outlet.

11. The engine air intake system of claim 10 wherein a third baffle is disposed within the confines of the duct on a section of said duct-to-air cleaner sealing sleeve.

12. The engine air intake system of claim 11 wherein said third baffle comprises a C-shaped exterior wall of said sealing sleeve, a lower curve of which seals against the periphery of the rear air outlet opening within the duct.

13. The engine air intake system of claim 12 wherein said hood-to-air cleaner sealing sleeve further includes a tail section depending outwardly of said duct beneath the rear air outlet opening, an end portion of said tail section flexibly sealing against an air cleaner housing inlet disposed therebeneath.

14. The engine air intake system of claim 10 and said hood-to-air cleaner sealing sleeve having an inner wall opening within said duct, said inner wall having, in radial section, an arcuate configuration flaring radially outwardly into said duct from said air outlet to form a bellmouth nozzle portion within said duct.

15. The engine air intake system of claim 6 wherein said bottom surface of said duct is substantially parallel to said hood surface and slopes downwardly forwardly from a location thereon beneath said second baffle to said first baffle and a drain means being disposed adjacent said first baffle.

16. The engine air intake system of claim 15 wherein a reservoir is provided in a rear corner of said bottom surface.

17. The engine air intake system of claim 16 wherein said reservoir includes a drain opening at a low point thereof and a one way drain valve seated in said opening.

18. The engine air intake system of claim 17 wherein said air outlet opening is formed in a rearwardly sloping rear wall of said duct immediately above said reservoir.

19. The engine air intake system of claim 16 wherein said reservoir forms an area of expanded cross section directly upstream of said rear air outlet opening.

20. The engine air intake system of claim 3 wherein said ambient air inlet is provided in a low forward area of said bottom wall.

21. The engine air intake system of claim 20 wherein a flange of said first baffle forms a dam therebehind under a trailing elevated portion of said baffle.

22. The engine air intake system of claim 21 wherein said bottom surface of said duct has a drain opening therein positioned immediately behind the flange of said first baffle.

23. The engine air intake system of claim 1 and a cylindrical duct-to-air cleaner sealing sleeve seated within an opening of said rear air outlet, said hood-to-air cleaner sealing sleeve having an inner wall opening within said duct, said inner wall having, in radial section, an arcuate configuration flaring radially outwardly into said duct from a wall portion parallel to the axis of said sleeve in said air outlet to form a bellmouth nozzle portion within said duct.

24. A vehicle hood comprising a skin, a duct structure disposed within said skin and attached thereto to form an air flow duct therewithin, said duct having an ambient air inlet and an air outlet from said duct adapted to engage an engine air cleaner, and an elastomeric duct-to-air cleaner sealing sleeve disposed in said air outlet, said sealing sleeve having an exterior wall disposed in sealing relation with said duct structure and an interior wall defining a passage therethrough for establishing fluid communication between a head end of said sealing sleeve disposed within said duct structure and a tail end of said sealing sleeve disposed exterior of said duct structure, the configuration of said interior wall at said head end comprising a bellmouth nozzle entrance section to said sleeve passage, said nozzle section diverging inwardly into said duct for smoothly channeling air flow in said duct into said air outlet.

25. The invention in accordance with claim 24 and said tail end of said sealing sleeve comprising a bellows section having an end sealing face disposed to sealingly engage an air cleaner.

26. The invention in accordance with claim 25 and said head end of said sealing sleeve having an exterior wall including a baffle section within the duct for channeling moisture within said duct away from said air outlet.

27. A sealing sleeve for establishing fluid communication between an air intake duct having an outlet located within a duct structure, said outlet having a peripheral edge, and an engine air cleaner inlet comprising circumferential elastomeric wall defining a cylindrical interior passage through said sleeve from a head end to a tail end thereof, an exterior surface of said circumferential wall having a circumferential groove disposed intermediate the ends of said sleeve, said groove having parallel walls and being of a predetermined width sufficient to sealingly engage said peripheral edge of said duct structure outlet, said circumferential wall being disposed to form a bellows portion in said tail end, said tail end having a sealing surface, an interior side of said circumferential wall at said head end of said sleeve comprising a bellmouth nozzle section formed, in radial section, by an arcuate inner wall surface converging inwardly into said passage from the head end of said circumferential wall to an interior wall portion parallel to the axis of said passage for smoothly channeling air flow from said duct into said passage.

28. The invention in accordance with claim 27 and the exterior surface of the head end of said sleeve comprising a C-shaped depression adjacent said circumferential groove.

* * * * *